US005440500A

United States Patent [19]

Mitchell et al.

[11] Patent Number: 5,440,500

[45] Date of Patent: Aug. 8, 1995

[54] SETTABLE PRINTING APPARATUS

[75] Inventors: Paul Mitchell, Herts; Peter J. Treadwell, Essex, both of United Kingdom

[73] Assignee: Pitney Bowes plc., Harlow, England

[21] Appl. No.: 151,602

[22] Filed: Nov. 12, 1993

[30] Foreign Application Priority Data

Nov. 13, 1992 [GB] United Kingdom ................. 9223893

[51] Int. Cl.6 ................................................ G01D 5/34

[52] U.S. Cl. ................................ 364/559; 250/231.18; 356/139; 364/550

[58] Field of Search ....................... 250/231.13, 231.14, 250/231.18; 356/139; 364/464.02, 550, 559

[56] References Cited

U.S. PATENT DOCUMENTS 4,736,187 4/1988 Kibrick et al. .......................... 341/3
4,901,073 2/1990 Kibrick .......................................... 341/13
4,914,437 4/1990 Kibrick et al. .......................... 341/3
5,254,919 10/1993 Bridges et al. ............. 250/231.14 X
5,266,796 11/1993 Leviton .......................... 250/231.18
5,329,121 7/1994 Leviton .......................... 250/231.13

*Primary Examiner*—Edward R. Cosimano
*Attorney, Agent, or Firm*—Charles G. Parks, Jr.; Melvin J. Scolnick

[57] ABSTRACT

The printwheel setting apparatus is used in a postage meter for setting the posting date printwheels. Each settable member of the apparatus includes digital encoding marks thereon. A charge coupled device is arranged to detect the encoding marks of one or more settable members simultaneously. A lens is disposed between the settable member and the charge coupled device to focus the image of the encoding marks onto the surface of the charge coupled device. Thus, the settings of a number of settable members such as thumbwheels may be determined simultaneously. A shutter may be closed across the charge coupled device to protect it from damage, dust contamination.

3 Claims, 4 Drawing Sheets

| CHARACTER | BINARY BITS | BAR CODE PATTERN |
|---|---|---|
| 1 | 00001 | 25a |
| 2 | 00010 | 25b |
| 3 | 10011 | 25c |
| 4 | 00100 | 25d |
| 5 | 10101 | 25e |
| 6 | 10110 | 25f |
| 7 | 00111 | 25g |
| 8 | 01000 | 25h |
| 9 | 11001 | 25i |
| 10 | 11010 | 25j |
| 11 | 01011 | 25k |
| 12 | 11100 | 25l |

SETTABLE PRINTING APPARATUS

BACKGROUND OF THE INVENTION

This invention relates to a settable printing apparatus. In particular, but not exclusively, the invention relates to a dater for a postage meter. A dater is defined as those components forming part of or operatively connectable to a postage meter which enable a user of postage meter to set the date to be printed by printwheels of the dater. The dater also has a function in providing a signal indicative of the date set, to enable verification of the accuracy of this date. This verification may be accomplished either by visual inspection of a displayed date; or by means of suitable processing circuitry in the logic board of the postage meter.

The invention also relates inter alia to a value printing (franking) mechanism for a mail processing apparatus such as a postage meter. A franking mechanism is similar to a dater in that it employs a settable gear train linked to a number of printwheels for franking a desired postage value.

The invention also is of use in other settable mechanisms in mail processing apparatus such as postage meters, folders, inserters and conveying apparatus.

Many postage meters employ a number of thumbwheels which are settable by the operator in accordance with the desired date. Incremental rotation of the thumbwheels causes incremental rotation of the dater printwheels, by means of a gear train. It is known to provide a dater which is constituted in part by an optical encoding mechanism which is capable of detecting the settings of the thumbwheels.

Previously proposed daters of this kind have employed encoding marks at various positions on the thumbwheels, and a retro-reflective light sensor capable of detecting whether a light or a dark portion is facing it. If the processor of the postage meter has been programmed appropriately, it is possible for the signals from the sensor to be interpreted as identifying a particular setting of one of the thumbwheels.

Alternative arrangements have been proposed, in which, for example, physical projections extending outwardly of the thumbwheels have been used to provide an optical encoding mechanism.

However, such known daters suffer from numerous disadvantages.

Firstly, it is necessary to provide a sensor circuit and a set of optical encoding marks for each thumbwheel. (Usually there are at least three thumbwheels in a dater, one for setting the day, one for setting the month and one for setting the year to be printed. Sometimes, two "day" thumbwheels are provided, one for setting the day decade and one for setting the day unit. Franking and other printing mechanisms may employ further thumbwheels.) Thus, the circuitry and physical arrangement of known daters are complicated.

Furthermore, the programming of a processor to which the dater is connected has to provide an absolute measurement of the set position of each thumbwheel. Thus, it is necessary to define a home position for the thumbwheel, and it may be necessary to include a non-volatile memory in the processor so that the dater does not have to be re-set every time the postage meter is switched on. It will additionally be appreciated by those skilled in the art that such an arrangement can lead to erroneous readings of the settings of the thumbwheels.

Moreover, since a plurality of sensors is required, the processing of data signals from the dater can be a comparatively lengthy process, particularly in low-cost postage meters where sequential processing of signals from the respective sensors is employed.

BRIEF DESCRIPTION OF THE INVENTION

According to a first aspect of the invention, there is provided a settable printing apparatus for a mail processing apparatus such as a postage meter, comprising: a settable member operatively connected to adjust a printwheel of e.g. a postage meter, the settable member or a further member adjustable in dependence thereon including optically detectable means indicative of the setting thereof; a charge coupled device (CCD) arranged to detect the optically detectable means and produce a signal indicative of the setting of the settable member; and focusing means for focusing an image of the optically detectable means onto the CCD.

Using this arrangement, a number of the disadvantages of known daters and other settable printing apparatuses are overcome. In particular, the use of a CCD having an adequately wide field of view, and/or a judicious choice of focusing means, permit the CCD to view the optically detectable means of a plurality of settable members, such as thumbwheels, simultaneously if required. The CCD may then generate a signal uniquely identifying the combinations of settings detected. Thus, the processing of the signals from the dater, etc. can be accomplished very rapidly (since a single data line may be used). Moreover, since each combination of settings may be uniquely identified, there is no need to provide for a home position of the settable member(s) nor is there a direct need for a non-volatile memory.

The optically detectable means are, in preferred embodiments of the invention, either digits marked on settable member(s) or said further member(s) in the form of thumbwheels, or e.g. a form of bar code marked on the settable member(s) or further member(s). If an area-type CCD is employed, either digital markings or bar codes may be employed. If a linear-type CCD is employed, digital markings are not effective.

Optional features of the invention include: illuminative means e.g. an IR LED (infra red light emitting diode) for illuminating the optically detectable means; a lens disposed between the optically detectable means and the CCD to constitute the focusing means; an anti-vibration mounting for the CCD; a real-time clock (which may advantageously be incorporated in the processor of the postage meter) and a comparator means whereby the setting of the printwheels corresponding to the positions of the settable members may be verified; and means whereby any digits marked on the settable member(s) can be made visible to an operator of the dater, etc.

A further optional feature is the combination in the apparatus of a comparator means and means permitting the inputting by the operator of data corresponding to a "pre-date" setting, whereby the date setting of the printwheels may be compared with a desired pre-date setting.

Preferably, the apparatus includes a plurality of settable members and a plurality of bar codes marked on the settable member(s) or a plurality of further members adjustable in dependence thereon, the number of different bar codes on each member being determined by the kind of printwheel to which the respective settable member is operatively connected.

Conveniently, (i) a settable member or further member connected to a "month" printwheel includes twelve different bar codes; (ii) a settable or further member connected to a "day decade" printwheel includes at least four different bar codes; and (iii) a settable or further member connected to a "day unit" printwheel includes at least ten different bar codes.

The lens, if used, advantageously protects the surface of the CCD from contamination by, e.g., dust, ink and fragments of paper from mail pieces being processed in the postage meter. An optional feature is a shutter which may be closed across the CCD when it is not required to detect the optically detectable means, and which opens when it is desirable for the dater or the franking printwheels to operate. In preferred embodiments of the invention, the shutter is operatively linked to the drum door of a postage meter so that when the postage meter drum door is opened and subsequently closed the shutter opens to enable the CCD to verify the settings of the settable members.

According to a second aspect of the invention, there is provided a postage meter including a settable printing apparatus as specified above. The settable printing apparatus may optionally be incorporated partly in the drum of the postage meter and partly in the chassis/-frame thereof, or entirely in the drum. In preferred embodiments, the CCD is mounted on the chassis of the postage meter and the settable members are mounted to act on respective printwheels in the print drum. Means may be provided for setting of the franking value or the dater setting. Thus, the settable members may readily operatively engage the printwheels of the postage meter.

In such an embodiment, it is preferable that either the or a settable member bearing the optically detectable means is arranged to protrude beyond the envelope defined by the print drum; or the further member adjustable in dependence on the settable member and bearing the optically detectable means is arranged so to protrude.

In embodiments wherein the settable member itself protrudes, this advantageously makes the settable member easier for an operator of the postage meter to use, and also provides greater versatility in the positioning of the CCD relative to the settable member, thereby to allow the CCD to operate. Preferably, the protrusion of the settable member is achieved by means of a gear train having a sufficient number and/or size of gear elements to cause the settable member to protrude.

In embodiments wherein there is provided a further member bearing the optically detectable means and protruding beyond the envelope as aforesaid, the settable member may be positioned remotely from the further member, e.g. part way along a gear train between the further member and the printwheel.

Such an arrangement advantageously allows the reading of e.g. a bar code on the further member to be carried out by the CCD at a convenient location externally of the print drum, without the danger of e.g. wear caused by and dirt from an operator's fingers obscuring or defacing the bar code etc. over time. Moreover, if the settable member is located part way along a gear train, backlash in the gear train on adjusting of the settable member is reduced since the sortable member operates against resistance provided by both "upstream" and "downstream" gears in the train.

In such arrangements, the protrusion of the settable member beyond the print drum envelope is not excluded, to facilitate adjustment thereof. The settable member may also bear operator-readable setting indications.

A further feature of a preferred embodiment of the invention is that the CCD is arranged only to detect the optically detectable means when the print drum occupies a home position. This feature provides numerous advantages in terms of the control and reliability of the postage meter, and facilitates compliance of a postage meter incorporating the invention with Post Office regulations.

There now follows a non-limiting description of a preferred embodiment of the invention, by way of example, with reference being made to the accompanying drawings.

DESCRIPTION OF THE PREFERRED EMBODIMENTS

Figure 1:
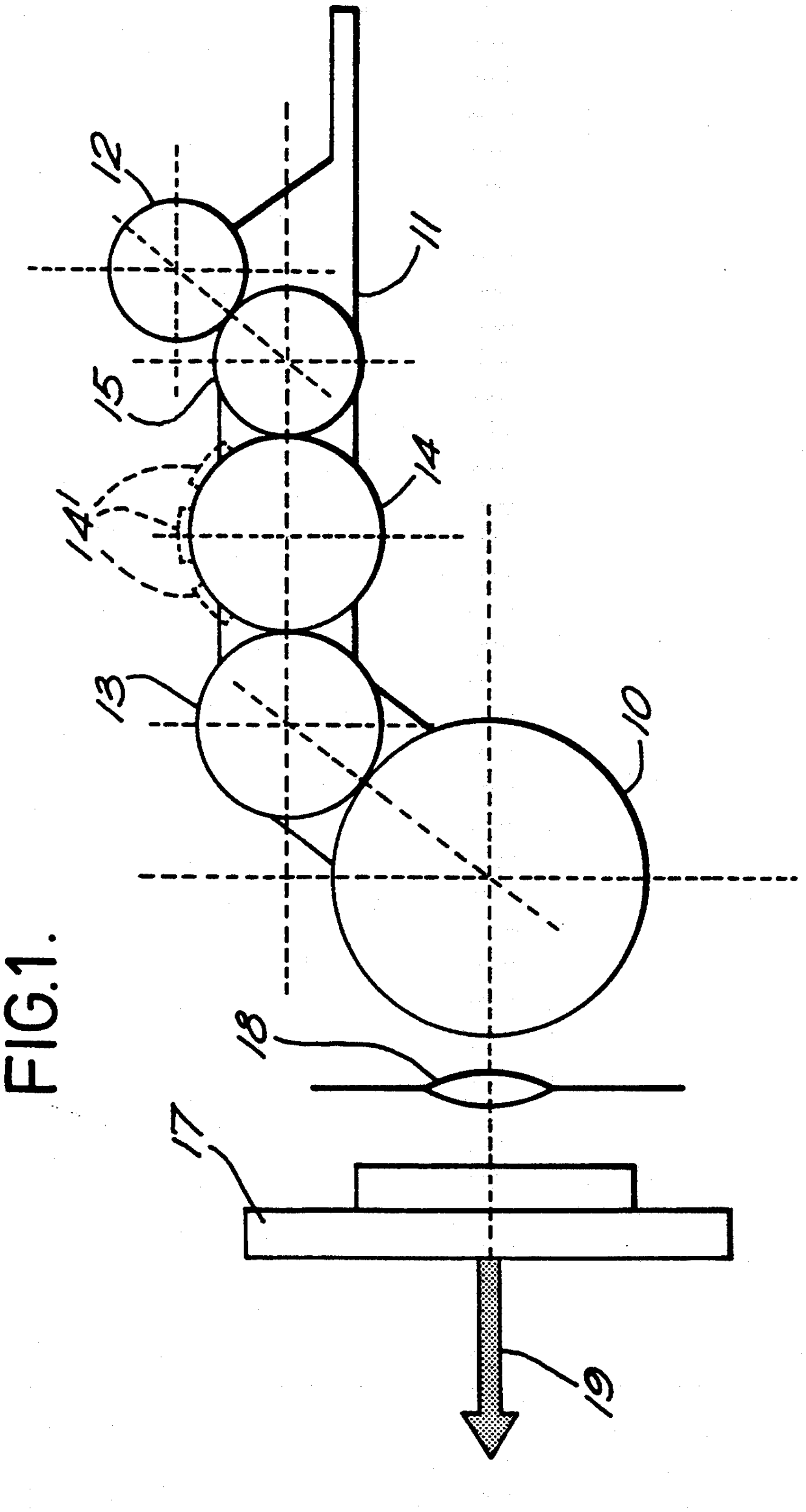
FIG. 1 is a schematic representation of a dater according to the invention.

Referring to the drawings, there is shown a dater comprising (in the exemplary embodiment shown) a single thumbwheel (i.e. a settable member) 10 which is rotatably mounted in a dater frame 11. Thumbwheel 10 is drivingly connected to a printwheel 12 by means of a chain of meshing gear wheels 13, 14, 15.

The thumbwheel 10 and printwheel 12 respectively also incorporate meshing gear teeth, to enable rotational drive of thumbwheel 10 to be transferred to printwheel 12.

In the embodiment shown, the train of gears 13, 14, 15 and the printwheel 12 are rotatably mounted on frame 11. The rotatable components thus far described are mounted generally in a common plane, with their rotational axes generally parallel.

Figure 5:
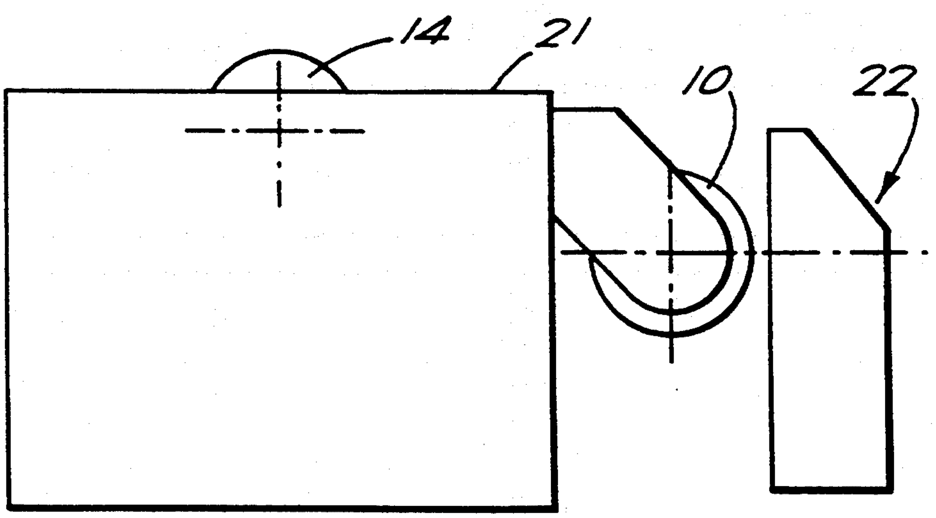
FIG. 5 shows part of a postage meter incorporating the components of FIGS. 1 to 4.

The frame 11 and the components secured thereto are, in use of the dater, secured in the print drum 21 of a postage meter as shown in FIG. 5.

It will be appreciated that, in a practical embodiment, there will be several parallel sets of components such as components 10, 11, 12, 13, 14, 15 in the print drum 21. Thus, a plurality of thumbwheels and printwheels may be provided. The thumbwheels and gear mechanisms may cooperate with one another in such a way as to allow for incrementing of the date which may be printed by the printwheels 12. For instance, there may be provided two "day" printwheels operatively connected to a single thumbwheel 10 such that any number of day between 1 and 31 may be selected by appropriate rotation of the thumbwheel 10; there may be a similar arrangement for selection of the month (although only a single printwheel will probably be required) and possibly a further arrangement for selection of the year. Thus, there would be three thumbwheels and five printwheels. Other arrangements are possible, such as providing some of the settable members in a form adjustable by means of a pick. Such settable members are typically used for setting the "year" printwheels since they are usually only adjusted once a year. (It is sometimes desirable to avoid the accidental re-setting of such printwheels, as may occur when a thumbwheel is used.) If pick-settable members are used, optionally they are not provided with encoding marks readable by the CCD described below.

The thumbwheels may be connected in such a way that, for example, incrementing of the day setting beyond the 31st day in any particular month may lead to incrementing of the month printwheel without the need for operation of the month thumbwheel.

The thumbwheel(s) 10 are arranged, by virtue of the number and size of the gear wheels 13, 14, 15, to protrude beyond the envelope defined by the print drum 21. This makes the thumbwheel(s) 10 easily accessible to an operator, and also permits the ready positioning of a CCD 17 in a reading module 22 for viewing of the optically detectable means on the thumbwheel(s) 10.

In an alternative arrangement, the thumbwheel can be located at the position 14 shown in FIG. 1. In such an arrangement, the component 10 consists of a further member (ie. gearwheel) adjustable in dependence to the thumbwheel 14 and bearing optically detectable means that are intended to be read by the CCD 17. Reference numeral 14' indicates numerical markings that may be applied to the surface of the thumbwheel when it occupies the position indicated at 14, and whereby an operator may visually check the thumbwheel settings. Means such as a window will be required to allow such visual checking, although it is not essential for the thumbwheel 14 to protrude beyond the print drum envelope since the thumbwheel 14 can be adjusted e.g. by means of a pick that may be inserted via a suitable aperture in the print drum.

A convex lens 18 or a lens or lens system 36 (FIG. 4) having a convex lens effect is disposed between the thumbwheel(s) 10 and the light-sensitive surface of the CCD, thereby to focus images of optically detectable markings on the thumbwheel(s)/further member(s) 10 on the surface of the CCD.

It will thus be appreciated that a single CCD can detect the optically detectable markings on the surface of a plurality of thumbwheels simultaneously. The CCD produces signals (represented by the arrow 19) which are indicative of the optically detectable means detected by the CCD on the thumbwheel(s)/further member(s) 10, and hence which are uniquely indicative of the combination of settings of the thumbwheels 10.

The signals 19 may be transmitted along a suitable data line (not shown) to a processor associated with the postage meter. The processor may include a real time clock and a comparator, whereby the date setting detected by the CCD may be compared with the real time, to ensure the veracity of the date to be printed on mail pieces to be processed in the postage meter.

The optically detectable means may be digits marked on the thumbwheels 10, or they may be in the form of bar coding. Other markings may be used, such as shapes having light and dark areas.

It will be appreciated that the CCD 17 may be located at any convenient orientation relevant to the thumbwheel(s)/further member(s) 10. It will also be appreciated that the CCD may be arranged to view a different portion of the thumbwheels 10 when located at 10 from that which may be visible to an operator of the dater. If so, an arrangement would have to be provided whereby the encoding of the positions of the thumbwheels 10 corresponds to the date to be printed by the printwheels 12. One way of achieving this is to provide for a conversion routine in the processor (not shown) of the postage meter, whereby the detection of one set of digits on the thumbwheels 10 by the CCD 17 corresponds to a different numerical date setting at the printwheels 12. Thus the CCD may readily be sited at a convenient location despite the confined nature of the interior of a postage meter.

In the remainder of the description, references to "thumbwheel 10" may be taken to indicate the component 10 when configured either as a thumbwheel or as a gear wheel or other component remote from the thumbwheel but bearing markings detectable by the CCD 17.

Figures 2, 3:
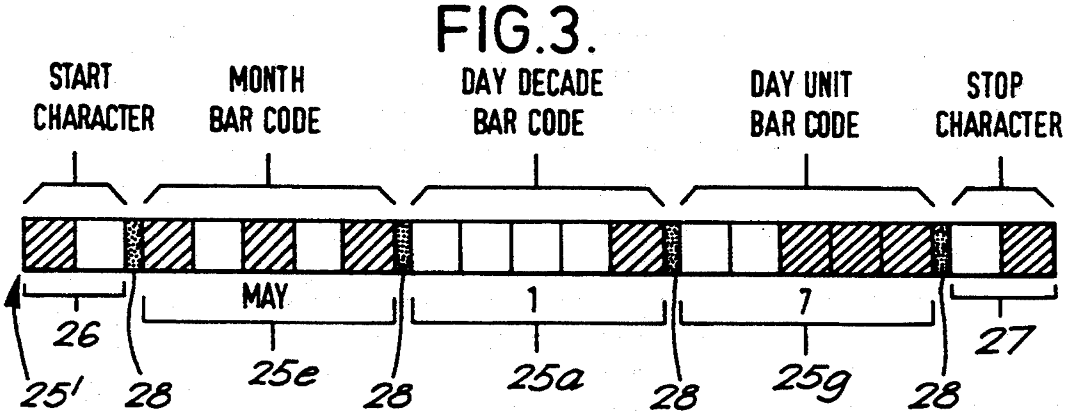
FIG. 2 shows a bar code pattern that may be applied to the thumbwheel(s) of the dater of FIG. 1.
FIG. 3 shows the bar code pattern of a plurality of thumbwheels, corresponding to a set date of May 17.

FIG. 2 is a table showing preferred 5 bit bar codes *25a–25l* that may be applied to the thumbwheel(s) 10. Twelve different bar codes 25 are provided, to allow for the unique identification of twelve positions of the "month" thumbwheel. Obviously only the bar codes *25a–25c* would be employed in respect of the first "day" thumbwheel since the third day decade is the highest used in specifying a date in a month; it is desirable also to have a fourth bar code on the day decade thumbwheel, indicative of a "blank" setting of the relevant printwheel for printing dates having numbers less than ten. At least the bar codes *25a–25j* would be employed in respect of the second "day" thumbwheel (if present) to provide unique identification of the day units between 1 and 9 and then 0 in a decade. (The bar code *25j* may conveniently double to identify the tenth position of a "month" thumbwheel and the position corresponding to zero in a "day" thumbwheel. ) In practice this thumbwheel may include all the bar codes *25a–25l*, to allow for economy of manufacture.

Each bar code representative of a date preferably comprises 19 bits, allocated as follows:

2 start bits
5 month bits
5 day decade bits
5 day unit bits
2 stop bits.

Of course, the month bits may be positioned after the day bits in the sequence, to allow the apparatus to be used in territories where it is usual to print the day before the month in the date sequence. Other, similar variations are possible in embodiments wherein bits are provided indicative of the "year" printwheel settings.

FIG. 3 shows the exemplary bar code 25' corresponding to a date of May 17. Two start bits identified by numeral 26 occur at the left hand end of the code, and two stop bits 27 at the right hand end. (Two bits are needed for the start and stop commands so that these commands are distinct from one another.)

The bar code 25' is read from left to right in the version shown. Thus, a 5-bit bar code *25e* (corresponding to a month setting of the fifth month) immediately follows the start bits 26. There then follow 5-bit bar codes *25a* and *25g* (corresponding to the day decade setting of '1' and the day unit setting of '7') and the stop bits 27. The bar code elements *26, 25e, 25a, 25g* and 27 are separated by respective air gaps 28 corresponding to the spaces between adjacent thumbwheels.

Figure 4:
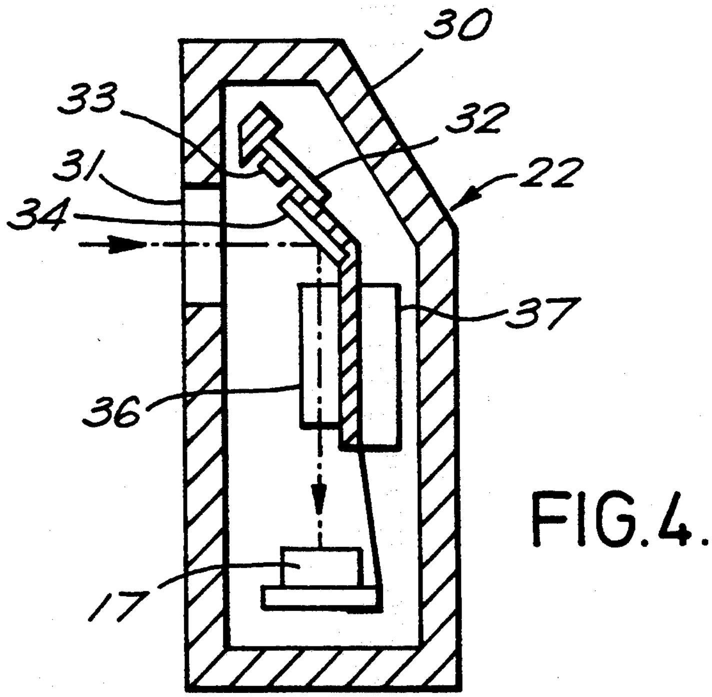
FIG. 4 is a vertical section through a bar code reading module according to the invention.

Referring to FIG. 4, an exemplary bar code reading module 22, containing the CCD, is shown. Module 22 comprises an opaque housing 30 having formed therein an optical window 31. Window 31 is preferably non-transmissive of all light frequencies except infra-red. (This limits the stray light entering the module.)

Disposed within housing 30 on a support 32 is a source of IR light, such as an IR LED 33. In practice, many (e.g. eight) IR LED's may be provided to illuminate the bar codes correctly. LED 33 is so positioned that its light output passes through window 31 and is incident on the optically detectable portions of the thumbwheel(s) 10.

IR light so transmitted is reflected from the thumbwheel(s) 10 as indicated by the arrows in a light and dark pattern characteristic of the encoding marks (or numerals) visible to the module 22. The reflected light passes back through the windows 31 and is reflected through 90° by a mirror 34 supported within housing 30. The reflected light is then focused as a real, erect image by means of a so-called SELFOC lens array 36 onto the surface of CCD 17. The use of a 90° reflection allows the module 22 to be shaped to fit into a postage meter.

The output pins of CCD 17 are connected to a connector 37 which has contacts on the exterior of housing 30 to allow the module 22 to be plugged into a postage meter. The module is located as shown in FIG. 5 relative to the thumbwheels.

The support 32 is in the embodiment shown configured as "flexi-rigid" printed circuit board (PCB) which conveniently serves the functions of mounting the components in a comparatively vibration-proof manner, and electronically interconnecting the components.

The CCD 17 is preferably a 2048 pixel CCD in the embodiment shown, although other CCD's may be used. The CCD then converts the optical image focused onto its pixels, into a series of 2048 voltages (one for each pixel). These voltages are then clocked out, one at a time in a serial format. These voltages, however, are analogue and therefore require converting to a digital signal so that the microprocessor on the logic board is capable of analysing the image. Therefore a small amount of processing of the CCD output is performed within the module to provide the required digital signal.

The digital signal will be purely representative of the image seen by the CCD, ie. "1" for black and "0" for white.

Each bar on the code is preferably 0.8 mm wide. Therefore, assuming a 1:1 relationship and that the lens array 36 provides a real image, this corresponds to 57 pixels on the CCD. A tolerance will be applied to the number of pixels (or bits once the digital conversion has taken place) for each bar, using software so that the 2048 binary bits may be reduced to 19, one for each bar.

The module 22 is preferably appropriately sealed to prevent dust, ink, shreds of paper and other contaminants from contacting the surface of CCD 17. The entry of stray light is also prevented. A shutter (not shown) may also be employed to protect the CCD 17. The shutter may be optionally connected to the drum door of the postage meter, whereby, on opening of the drum door the CCD 17 is able to view the thumbwheels 10 to verify the date setting against, for example, the date reading of a real-time clock in the processor of the postage meter. The control of the postage meter may also be arranged such that the shutter opens on initial powering up of the postage meter and/or a short period after closing of the module door, whereby the date set by the thumbwheel(s) may be verified.

The window and mirror are conveniently provided with a chemical and/or scratch resistant surface finish.

The control of the postage meter may include an override function, whereby the thumbwheels 10 may be set to a date other than that generated by the real time clock (if any), thereby to allow users of the postage meter to send pre-dated mail. A suitable comparator and input means (e.g. a keypad) may be provided to allow a comparison between the desired pre-date and the thumbwheel (or other settable member) settings.

In some embodiments, it may be advantageous for there to be no user-identifiable markings on the thumbwheels. Instead, the output of the CCD can be suitably processed to produce a digital readout on a display means (not shown), whereby an operator of the dater would be able to ascertain the setting of the thumbwheels without the need for referring visually to them.

The control and positioning of the components may be arranged such that the CCD 17 is only operable to read the settings of the thumbwheels 10 when the print drum in which the thumbwheels 10 are mounted occupies a home position or another pre-determined position.

The CCD 17 may be mounted on an additional or alternative anti-vibration mounting. This may be a resilient mounting such as a spring, a rubber block, etc. Alternatively, a device such as a dynamic vibration absorber may be employed to ensure that the CCD 17 is stable relative to the thumbwheels 10, thereby to ensure the accurate reading of data.

Figure 6:
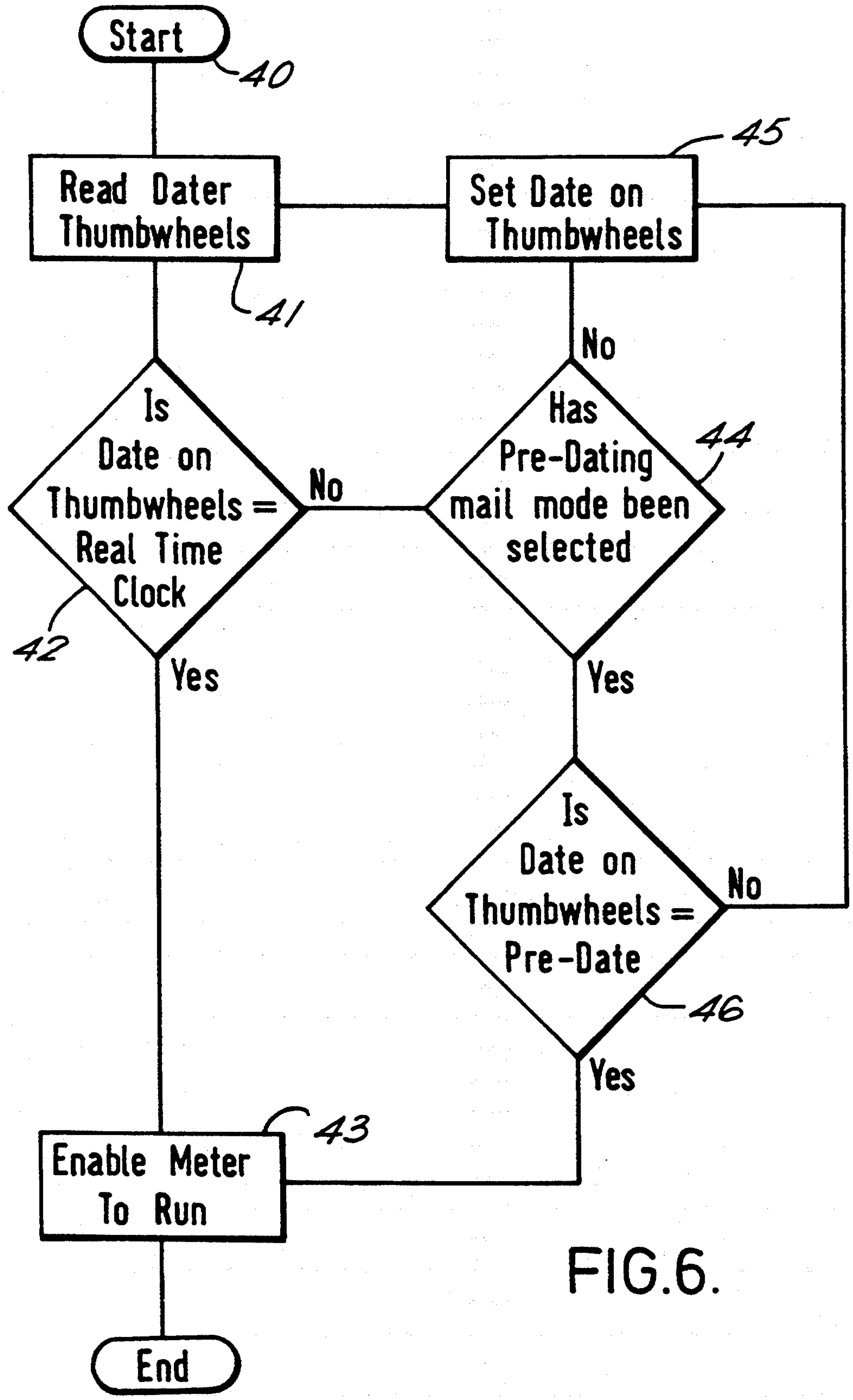
FIG. 6 shows schematically a bar code reading routine.

Referring to FIG. 6, the bar code reading routine is shown in algorithmic form. At power up, 40, or resetting, the module 22 reads the dater thumbwheels 10, as indicated by command 41. If, as indicated by decision 42, the date on the thumbwheels is the same as that indicated by the real time clock of the postage meter, the postage meter is enabled to operate (command 43). If the comparator detects a discrepancy between the real time clock date and the thumbwheel date, on interrogation is made (44) as to whether the meter has been set to run in pre-dating mail mode. If the answer to this interrogation is negative (45) the operator is prompted to set the thumbwheel accurately, and the thumbwheel reading step is repeated. If, however, the processor determines that pre-dating mail mode has indeed been selected, a further interrogation 46 is necessary to check that the thumbwheel date is the same as the desired (ie. previously inputted) pre-date. If so, the meter is allowed (43) to run; otherwise, the operator is prompted to adjust the thumbwheels.

Although in this application reference is made to thumbwheels as the settable members of the daters, it will be appreciated that the settable members may take other forms. For instance, the settable members may be levers or sliders and may also be used to set rotary printwheels to print a desired franking value. Combinations of difference types of settable members may be employed in a single dater.

It will be appreciated that embodiments of the invention need not be confined to those constituting a dater. As previously mentioned, the invention may readily be embodied as, e.g, a value printing mechanism, or any other kind of settable printing apparatus employed in a postage meter, franking machine or similar device.

We claim:

1. An improved settable printing apparatus for a postage meter, said postage meter having a postage meter housing, wherein the improved settable printing apparatus comprises:

a plurality of print wheels; support means fixably mounted within said postage meter for rotative supporting each of said print wheels within said postage meter such that said print wheels are aligned along a common axis;

a plurality of settable members rotatively mounted to said support means and operatively connected to a respective one of said print wheels for adjusting said respective one of said printwheels to one of a plurality of predetermined position;

a charge couple device fixably mounted to and within said postage meter having a plurality of detectors and an illumination means for providing a illumination by a light source;

each of said settable members having an optical detectable means, said optical detectable means having a plurality of sequentially aligned multi-digit bar code markings positionable to an index position such that one of said bar code markings is positioned to said index position in response to said respective settable member positioning said respective print wheel to a respective one of said predetermined positions such that said bar code marking is correlatable to a unique one said predetermined positions of said respective print wheel;

said illumination means being aligned to illuminate said bar code markings of said respective settable members only when said bar code markings are positioned at said respective index position;

said respective digit of said bar code marking being reflective of said illumination or non-reflective of said illumination;

focusing means for focusing reflective illumination from said respective bar code marking of said respective settable member to a respective one of said detectors; and, said charge couple device having means for generating a unique signal correlatable to a respective combination of said detectors receiving said illumination.

2. An apparatus as claimed in claim 1 wherein the settable member is a thumbwheel operatively connected to a printwheel of said mailing machine.

3. An apparatus as claimed in claim 2 wherein said illuminative means comprises an IR LED for illuminating the optically detectable means, thereby to facilitate operation of the CCD.

* * * * *